United States Patent [19]
Takeuchi et al.

[11] Patent Number: 5,478,136
[45] Date of Patent: Dec. 26, 1995

[54] HEADREST AND METHOD FOR ITS PRODUCTION

[75] Inventors: Nobuo Takeuchi; Hiyoshi Ishikawa, both of Anjo, Japan

[73] Assignee: Inoac Corporation, Aichi, Japan

[21] Appl. No.: 389,471

[22] Filed: Feb. 16, 1995

[30] Foreign Application Priority Data

Aug. 28, 1994 [JP] Japan ..................................... 6-225511

[51] Int. Cl.$^6$ ..................................................... A47C 7/38
[52] U.S. Cl. ........................... 297/391; 297/220; 264/46.7
[58] Field of Search ..................................... 297/220, 221, 297/391, 396, 410; 403/230, 252; 264/46.7

[56] References Cited

U.S. PATENT DOCUMENTS

| | | | |
|---|---|---|---|
| 4,003,599 | 1/1977 | Takamatsu | 297/220 |
| 4,738,809 | 4/1988 | Storch | 264/46.7 X |
| 4,891,081 | 1/1990 | Takahashi et al. | 264/46.7 X |
| 5,165,754 | 11/1992 | Louys | 297/391 |
| 5,261,726 | 11/1993 | Yanagishita | 297/391 X |

FOREIGN PATENT DOCUMENTS

| | | | |
|---|---|---|---|
| 0083632 | 5/1984 | Japan | 264/46.7 |
| 1125836 | 6/1986 | Japan | 264/46.6 |

Primary Examiner—Peter R. Brown
Assistant Examiner—Stephen Vu
Attorney, Agent, or Firm—Lowe, Price, LeBlanc & Becker

[57] ABSTRACT

A doughnut plate type stop member is fixed to an opening edge of a stay hole formed on a skin. A concave groove is provided at a predetermined position of a stay of an insert. The stay extending from a base portion is disposed to protrude outward by inserting through the stay hole upon disposing the base portion of the insert in the skin. The stop member is engaged with the concave groove. Upon securing the foregoing condition, a foamed plastics material is poured into the skin, and a headrest is produced by providing a foamed plastic unit integrating the skin and the insert by means of a foam molding.

3 Claims, 6 Drawing Sheets

HEADREST AND METHOD FOR ITS PRODUCTION

BACKGROUND OF THE INVENTION

1. Field of the Invention

The present invention relates to headrest to be mounted on an upper end of a seat back of automobile and the like and a method for its production.

2. Description of the Related Art

The headrest that is vertically adjustable is mounted on an upper end of a seat back of automobile and the like to protect the head of a passenger and to secure a comfort to him.

As a method for production of such headrest, there have heretofore been two methods, (1) a method of performing an foam molding of a headrest not covered with a skin and then covering it with a skin, and (2) a method of performing a so called skin-integrated foam molding that doubles a covering of the skin in the formation of a foamed plastic unit that becomes a pillow.

Figure 10:
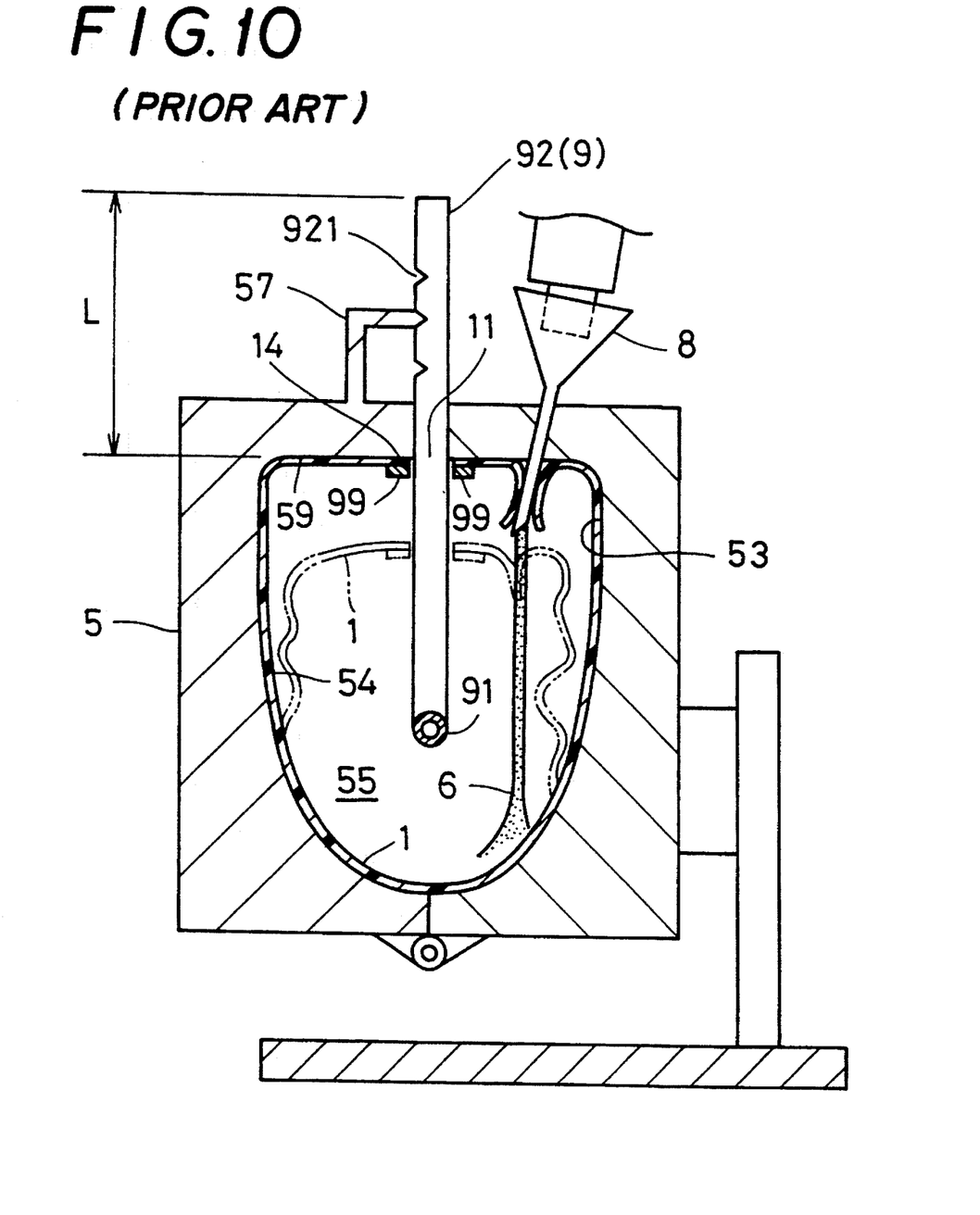
FIG. 10 is an explanatory cross sectional view of a prior art.

With respect to the foregoing method (2) of the skin integrated foam molding, stay 92 was inserted into a stay hole 11 of the skin 1 to be protruded outside in the first place, and a base portion 91 of an insert 9 was disposed in the skin 1 to produce an assembly. Next, they were set on cavity surfaces 53 and 54 of a foaming mold 5 (FIG. 10). Thereafter, a foamed plastics material 6 was poured into the skin 1 using a funnel 8 and the like to conduct the foam molding, curing and opening of a mold whereby a desired headrest was provided.

However, the headrest produced in the conventional skin-integrated foam molding had the following problems.

As the skin 1, a laminated skin such as cloth or blow molding skin made of polyvinyl chloride or the like was used, and when the foam molding was carried out pouring the foamed plastics material 6 after disposing the base portion 91 of the insert 9 into the skin 1, due to lack of rigidity in the skin 1, the skin tended to fall out on the bottom of the cavity 55 as shown in FIG. 10 (chained line as shown in FIG. 10). Even if a stop member 99 of doughnut plate type was mounted on an opening edge 14 of the skin 1, due to a slippage of the stay 92 made of metal, the setting of the stay 92 at the predetermined positions was found difficult.

As a result, in the setting of an assembled component of the skin 1 and the insert 9 in the foaming mold 5, one of notches 921 for lifting positioning that activate the stay 92 at the upper end of the seat back was caused to engage an insert holder 57 of the foaming mold 5, and moreover, the stay 92 was lifted to expand the skin 1, and the upper portion of the skin 1 was required to abut tightly on the upper surface of the cavity 59. This work required for the man-hour of about 5 seconds/piece, and became a work burden in a mass production. Also, even if the abovementioned measure was taken, the position of the skin was not determined due to lack of a structure of engaging the skin 1 at a predetermined position. As described hereinabove, even though the foaming mold 5 was clamped after arranging the skin 1, the stay 92 protruded from the opening edge 14 of the skin 1 and a length L was fluctuated. When the protrusion occurred and the length L became longer, creases were produced on a general surface of the headrest, or when the inverse protrusion occurred and the length L became too short, creases were produced on a lower surface of the headrest.

SUMMARY OF THE INVENTION

An object of this invention is to provide a headrest in which an opening edge of a skin is simply and positively set at a predetermined position of stay which facilitates an improvement in production and a stability in the quality of product, and a method for production of the headrests.

A gist of this invention resides in a headrest, comprising a baglike skin with openings for stay holes, an insert whose base portion is disposed in the skin and the stays being extended from the base portion is disposed so as to insert through the stay holes to be protruded outside, and a foamed plastic unit that is an integrated unit of the skin and the insert by an foam molding upon pouring of the foamed plastics material into the skin, the improved headrest in which doughnut plate type stop members are fixed to the opening edges of the stay holes, and concave grooves are provided at predetermined positions of the stays of the insert and the stop members are engaged with the concave grooves.

The headrest according to this invention obviates a slippage of the skin once the stop members are engaged with the concave grooves resulting in a reduction in the number of rejects and also in an elimination of one work process of lifting positioning of the skin in the foaming mold, and exhibits excellent effects in the improvement of productivity and in the stability of the quality of product or the like.

Further objects and advantages of the invention will be apparent from the following detailed description, reference being made to the accompanying drawings, wherein preferred embodiments of the invention are clearly shown.

BRIEF DESCRIPTION OF THE DRAWINGS

FIG. a decomposed perspective view before insertion of an insert into a skin of a headrest according to an embodiment;

FIG . 2 is an enlarged cross sectional view around stay holes the skin shown in FIG. 1;

FIG. 8 is a longitudinal cross sectional view showing a condition wherein the skin and the insert are set in a foaming mold and a foamed plastics material is poured in;

DETAILED DESCRIPTION OF THE PREFERRED EMBODIMENTS

Hereinbelow, this invention will be described in detail according to embodiments. A stationary type headrest is to be produced.

Figure 1:
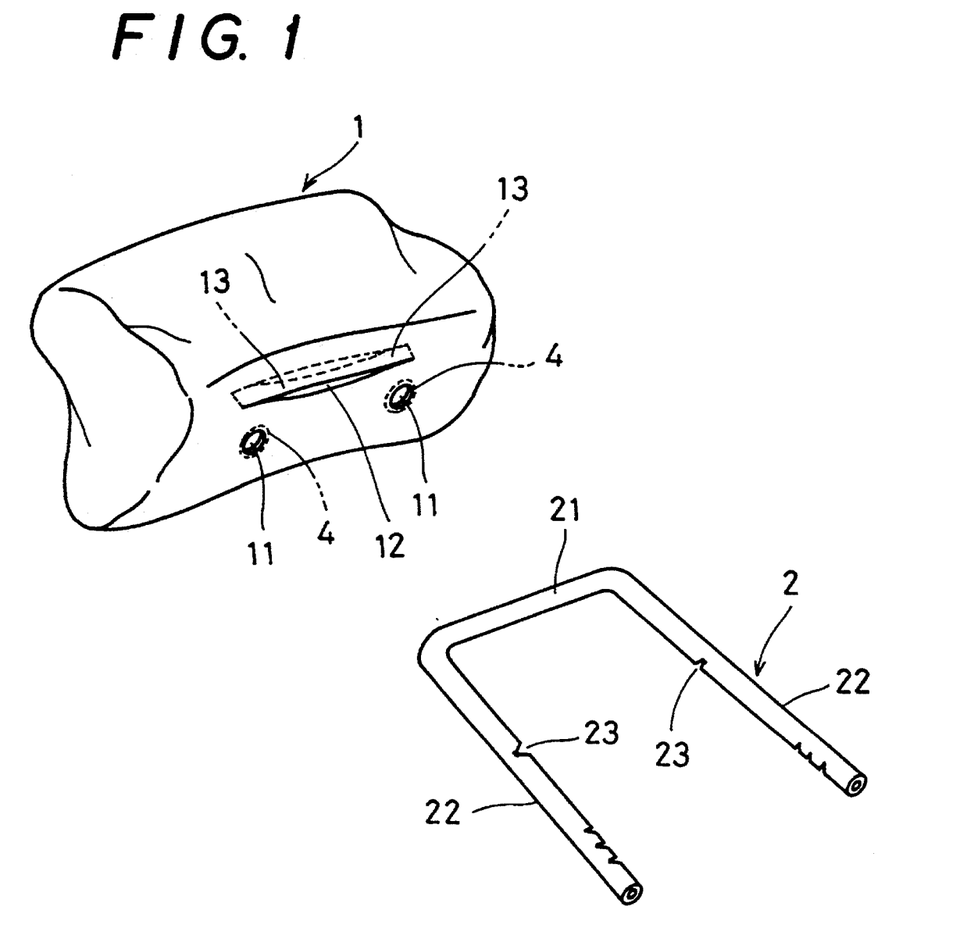
Figure 2:
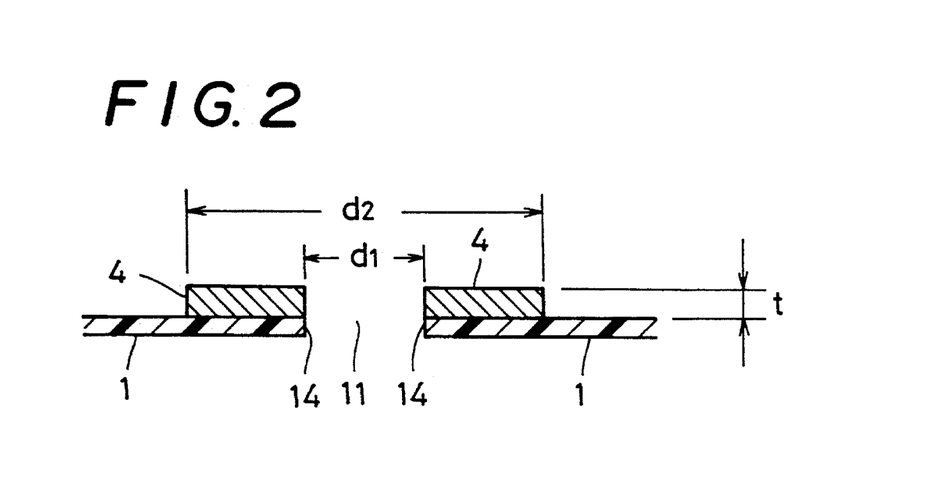
Figure 3:
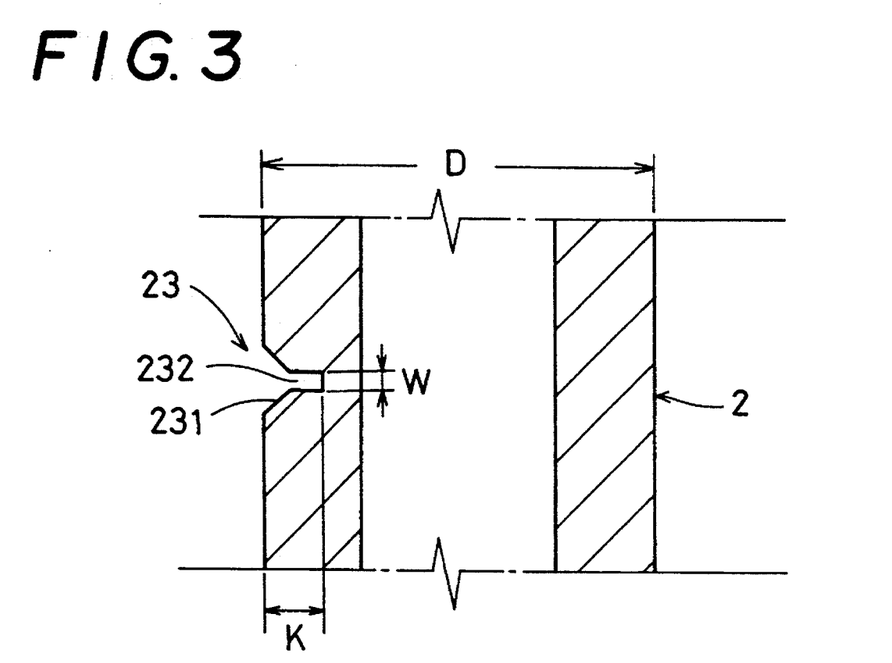
FIG. 3 is an enlarged cross sectional view of concave grooves of the insert shown in FIG. 1.
Figure 9:
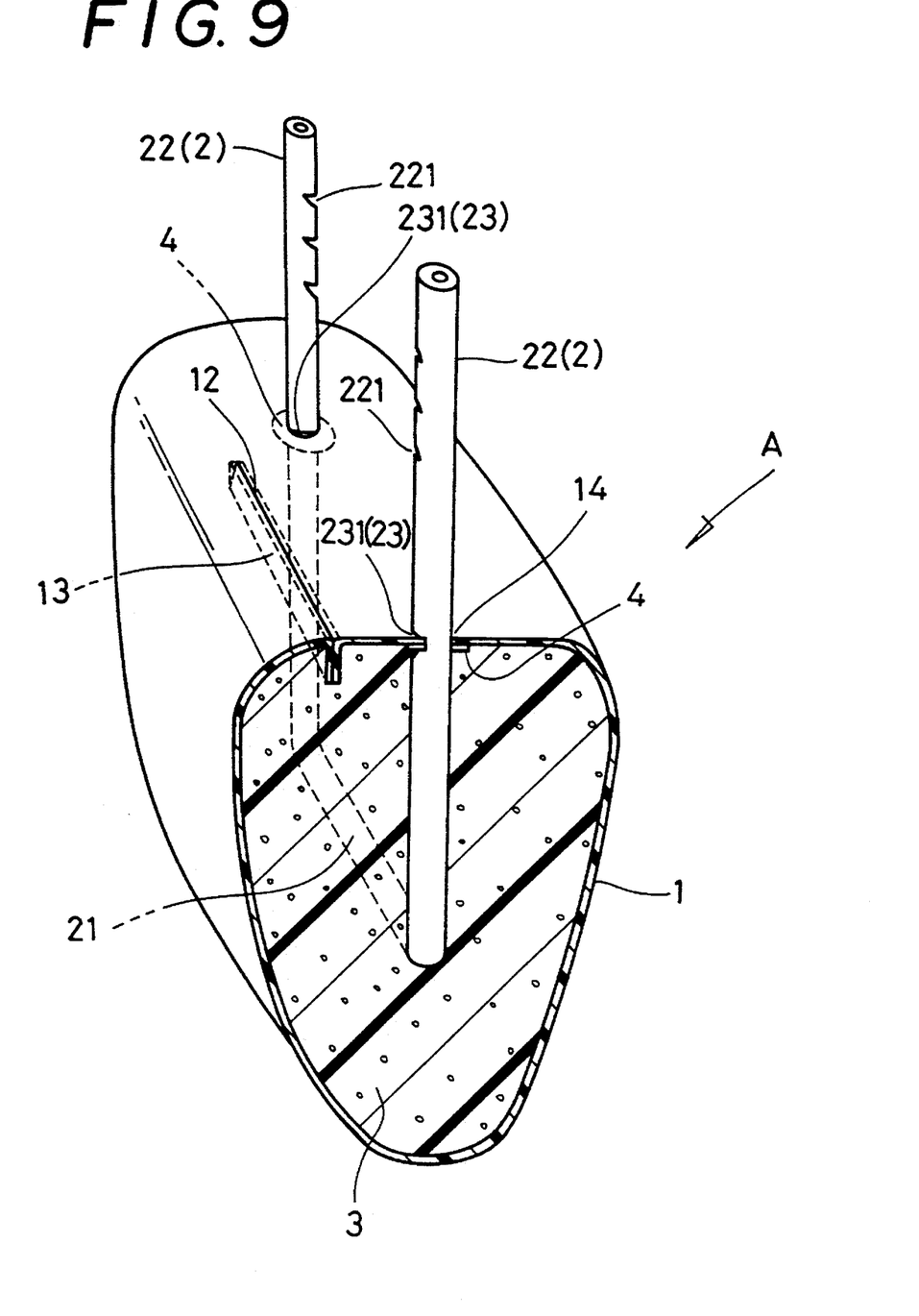
FIG. 9 is a perspective view of a partly sectioned headrest.

FIG. 1 is a decomposed perspective view before insertion of the insert into a skin of a headrest, FIG. 2 is an enlarged cross sectional view around stay holes of the skin, FIG. 3 is an enlarged cross sectional view of concave grooves, and FIG. 9 is a perspective view of a partly sectioned headrest.

The headrest A comprises a skin 1, an insert 2 and a foamed plastic unit 3 produced by curing a foamed plastics material. The skin 1 and the insert 2 are component parts, and the combined parts are set in a foaming mold 5, and then, a skin integrated foamed plastic unit 3 is produced by the foam molding whereby the headrest A is completed.

The skin 1 is produced in a predetermined bag form using a laminated skin formed by laminating a buffer material on a cloth and the like, a blow molded skin such as synthetic resin made (for example, polyvinyl chloride and the like), or sol slush molded skin and the like (FIG. 1). At the undersurface side of the skin 1, two pieces of stay holes 11 and 11 (inside diameter is about 9 mm) are open for insertion of stays.

Symbol 4 shows a stop member pasted to an opening edge 14 around a stay hole 11 of the skin 1 (FIG. 2). The stop member 4 is pasted to the inside of the skin 1 to be invisible from the outside. A shape of the stop member 4 is of a doughnut plate type whose thickness t is about 1 mm, the inside diameter $d_1$ is about 9 mm, and the outside diameter $d_2$ is about 18 mm. Herein, "doughnut plate type" means any plate having a hollow portion, and its inside periphery and outside periphery are not limited to a circle. As the material for the stop member, any material may be used such as one holding a predetermined elastic deformation, for example, synthetic resin like polypropylene (PP), acrylonitrile-butadienestyrene (ABS), foaming resin, solid paper and the like, and in this embodiment, polypropylene is used. For reference, the stop member 4 is pasted to the skin using a bonding agent, but the fixing may be made by sewing, fusing and the like.

Symbol 12 shows a slit type opening for insertion of a foamed plastics material 6 into the skin and is in a condition of being surrounded by a tongue member 13 of the skin 1.

The insert 2 is formed by bending a metallic pipe (outside diameter is about 10 mmφ) in ⊓-shape, and is inserted into a base portion 21 to be disposed in the skin and a stay 22 that is inserted into a stay hole 11 and a majority of which protrudes the outside of the skin. The stay 22 is formed with a concave groove 23 at a position wherein an opening edge 14 (concretely, the stop member 4) of the skin 1 is set at the time of the foam molding.

Figure 4:
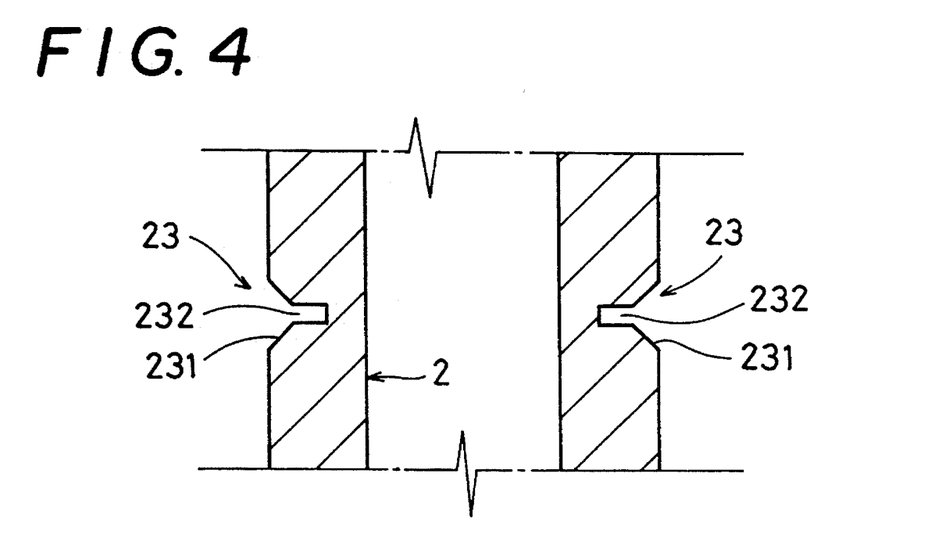
FIG. 4 is an enlarged cross sectional view of concave grooves of a different embodiment from that shown in FIG. 3.

The concave groove 23 comprises an inclined portion 31 that enlarges a cut in V-shape toward the surface side of the stay 22 and a deep groove portion 232 that moves in the central direction of the stay in its innermost (FIG. 3). Although the concave groove 23 is formed by notching a predetermined arc range on a horizontal cross section of the stay 22, as shown in FIG. 4, an annular groove may be formed by notching an entire peripheral surface of the stay 22. Namely, FIG. 4 shows an enlarged cross sectional view of the concave groove 23 of a different embodiment which corresponds to FIG. 3.

The inclined portion 231 expands in 45 degrees, the angle of elevation and the angle of depression respectively for both the top and bottom surfaces as shown in FIG. 3, and the deep groove width W is set at about 1.2 mm in correspondence to the stop member 4 and the skin 1. The outside diameter D of the stay is about 10 mmφ which corresponds to about 9 mm of the inside diameter of the stop member, and a distance K from the external surface of the stay to the deep groove portion 232 is about 1 mm. Symbol 221 shows a notch for positioning and fixing the headrest when the completed headrest is mounted on an upper end of the seat back.

For the production of the headrest A, the skin 1 and the insert 2 are previously prepared as an assembled unit (FIG. 1). The skin 1 is a laminated product of the abovementioned cloth and buffer material and is sewed previously in a cover form of the headrest A, and this cover is reversed so that the surface of the cloth becomes a top surface, and the tongue member 13 is disposed at the inside of the skin 1. In this case, the opening portion 12 doubles as a role of an opening for reversing the skin 1. For reference, as for the skin 1, a molded skin consisting singly of the synthetic resin made may be used.

Figure 5:
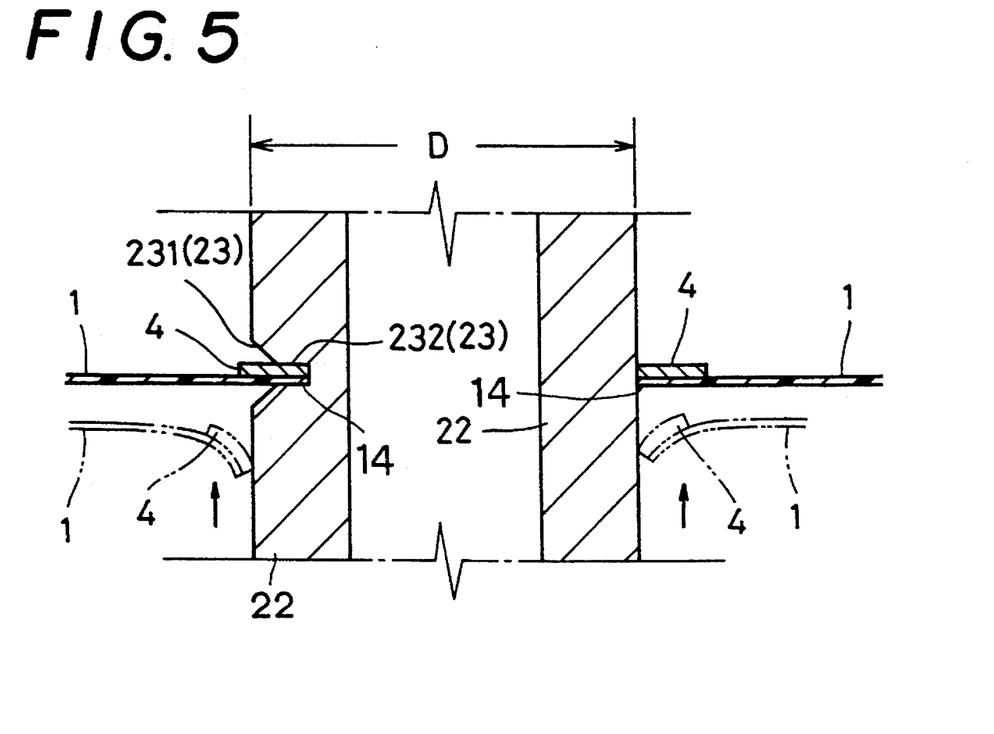
FIG. 5 is an enlarged cross sectional view showing a condition wherein stop members are engaged with the concave groove shown in FIG. 3.
Figure 6:
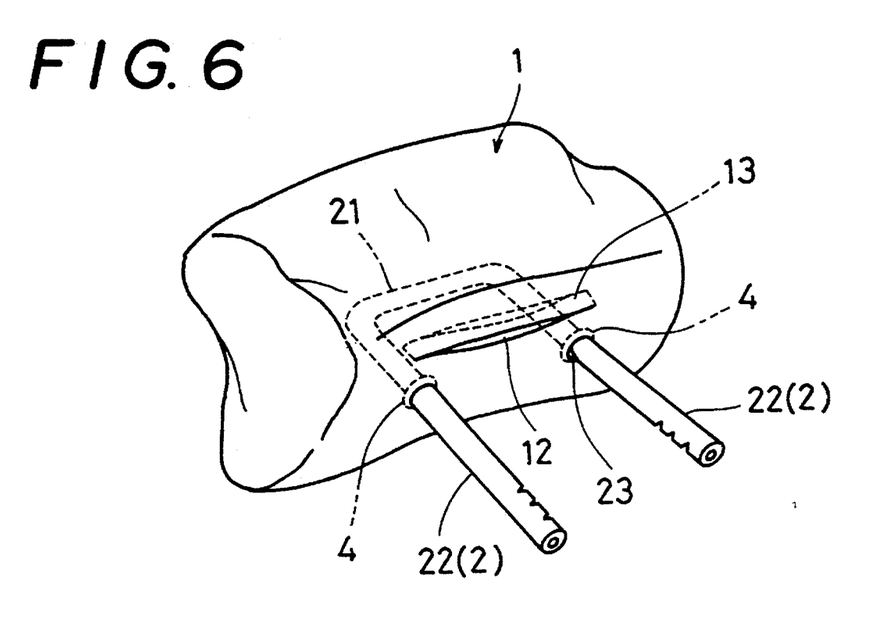
FIG. 6 is a perspective view showing a condition where the stop members are engaged with the concave grooves by disposing a base portion of the insert inside of the skin.

In the first place, the stay 22 pierces into the stay hole 11 of the skin 1 to protrude outwardly and the insert 2 is inserted into the skin 1 from the opening portion 12, and the base portion 21 is disposed in the skin 1 (FIG. 6). And then, the stop member 4 is fitted into the concave groove 23 of the stay 22, and the opening edge 14 of the skin is positioned to the position of the concave groove of the stay 22 (FIG. 5). For reference, in case the insert 2 is in ⊓-shape as shown in FIG. 1, one part of the insert 2 is inserted into the skin 1 through one of the stay holes 11 and 11, and the insert is arranged to protrude to the outside of the skin through the other stay hole 11 and the base portion 21 may be disposed in the skin. In this arrangement, as the opening portion 12 of the skin 1 is not used, the opening portion 12 may be made smaller.

The stop member 4, as described in the foregoing, is of a thin plate construction that has an inside diameter slightly smaller that of the diameter D of the stay, and therefore, the stop member 4 is inserted into the stay 22 according to the elastic deformation (chained line as shown in FIG. 5), and is engaged in the concave groove 23 on account of the elastic restoration at the concave groove portion. For reference, the concave groove 23 is formed with the inclined portion 231 that enlarges the cut at the surface side of the stay so that an engagement of the stop member 4 with the concave groove 23 becomes smooth. And then, once the fitting occurs, the fitting is made at the deep groove portion 232, which produces a condition where it is inescapable from the deep groove portion 232, and the position of the opening edge 14 of the skin 1 is fixed.

Thus, when the stay 22 is inserted into the stay hole 11 and the stay 22 is lifted, the stop member 4 is engaged at the time when the concave groove 23 passes the opening edge 14 of the skin 1 so that the opening edge of the skin Is simply and positively mounted at the predetermined position of the stay 22. When the inclined portion 231 is formed at the concave groove 23, the stop member 4 may enter the concave groove 23 which allows the smooth assembly operation of the skin 1 and the insert 2.

When the skin 1 and the insert 2 are assembled as described above, the opening edge 14 of the skin is engaged with the position of the concave groove of the stay 22, and there is no chance for its slip down from the predetermined position of the stay 22.

Figure 7:
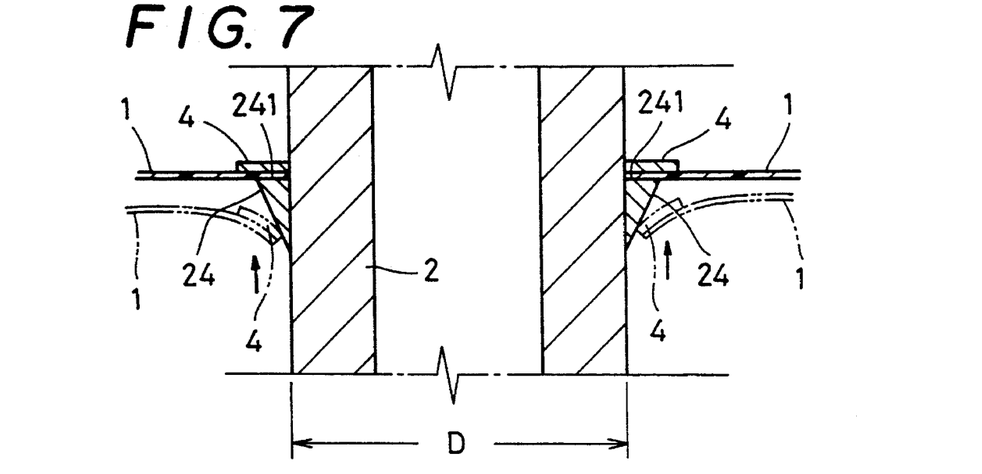
FIG. 7 is an enlarged cross sectional view around small projections provided on the stays of a different embodiment.

For reference, a small projection 24 as shown in FIG. 7 may be provided at a predetermined position of the stay 22 in lieu of the concave groove 23. The small projection 24 may be formed by, for example, a cladding with by welding and the like.

Preferably, the small projection 24 may be formed in a tapered off form as shown in the drawing toward the base portion 21. The stop member 4 easily rides over the small projection 24 with its elastic deformation (chained line as shown in FIG. 7) and once it rides over the small projection 24, the upper surface 241 of the small projection 24 demonstrates a locking function so that the stop member 4 is positively engaged with the small projection 24.

The small projection 24 may be arranged to surround a circumference of the stay 22, and it may be provided on its part. For reference, in case the small projection 24 is to be provided, if the inside diameter of the stop member 4 is arranged to be almost equal to the diameter D of the stay, the insertion of the stop member 4 into the stay 22 becomes easy, and when compared with the formation of the concave groove 23, the assembly operation of the insert 2 becomes much simpler. The small projection 24 may be formed producing a cladding with welding as mentioned above, or a small projection 24 may be formed producing a swell portion by a press forming and the like.

Figure 8:
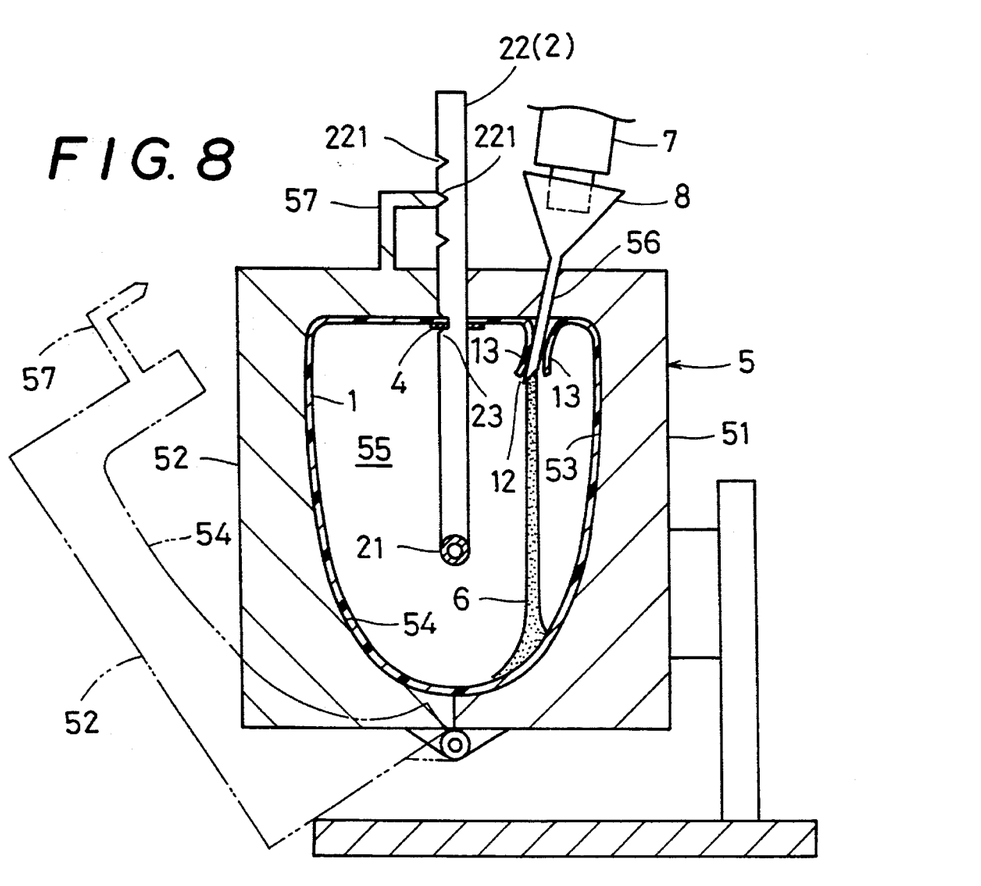

Next, the skin 1 and the insert 2 are set in a foaming mold 5 (FIG. 8).

The foaming mold 5 comprises a stationary mold 51 and a mobile mold 52, and the inside of the mold is provided with a cavity 55 to be formed by cavity surfaces 53 and 54. A foamed plastics material pouring hole 56 communicating with the inside and outside of the cavity 55 is formed on an upper part of the stationary mold 51, and an insert holder 57 is provided on the upper surface of the mobile mold 52. For reference, the foamed plastics material pouring hole 56 is arranged to open and close by a plug (not shown) provided by a hinge mechanism in its vicinity.

The setting of the skin 1 and the insert 2 in the foaming mold 5 is made by engaging the notch 221 for adjustment of height provided on the stay 22 of the insert 2 with the insert holder 57 in the open mold condition (chained line as shown in FIG. 8), and then, the mold is closed holding the insert 2 to be suspended in the cavity 55. Thus, with the stop member 4 being engaged with the concave groove 23, the opening edge 14 of the skin 1 remains in the concave groove 23 of the stay 22 that is positioned at the upper part of the cavity 55. Namely, in the method for production of the headrests described in the foregoing, when the stop member 4 is engaged with the concave groove 23 provided on the stay 22, the opening edge 14 of the skin 1 is in the condition of being set at the predetermined position of the stay, and the advancement into the foam molding may be accomplished as it is so that the setting operation of the skin 1 and the insert 2 into the foaming mold 5 goes smoothly.

Thereafter, the foamed plastics material 6 in the predetermined amount is poured into the skin by means of the funnel 8 or the like from an injection machine 7. To be concrete, a liquid foamed plastics material 6 such as polyurethane foam or the like is poured into the cavity 55 from the opening portion 12 of the skin 1 utilizing the foamed plastics material pouring hole 56, and after the pouring, the funnel 8 is pulled out, and the plug is put on the foamed plastics material pouring hole 56 whereby the foam molding of the integral unit of the skin 1 and the insert 2 is taken place.

The pressure of the foaming functions in a direction of causing the tongue members 13 and 13 to be in tight contact, and the foamed plastics material 6 bulges fully in the cavity 6, and once it is cured, the foamed plastic unit 3 of a pillow type which forms an integral unit of the skin 1 and the insert 2 is produced (FIG. 9).

Even if the skin 1 separates from the cavity surfaces 53 and 54 or the skin 1 deforms before the foaming, the skin 1 expands to be in tight contact with the cavity surfaces 53 and 54 by the foaming pressure, producing a desired form of the skin 1 covering the foamed plastic unit 3. In the process of the foam molding, as the stop member 4 seldom separates from the concave groove 23, creases never occur on the skin 1 enclosing the foamed plastic unit 3 due to the pouring pressure and foaming pressure of the foamed plastics material 6.

When the curing is finished, a cooling and mold opening process begins. The foaming mold 5 is made to open, and the headrest A that is the skin integrated foamed product is removed from the mold.

Thus, the produced headrest A is of a structure in which the stop member 4 adhered to the opening edge 14 of the skin is engaged at the predetermined position (position of the concave groove) of the stay 22, causing no position slippage on the skin 1 around the opening edge 14 and keeping the form of the skin 1 enclosing the foamed plastic unit 3 at the time of the production.

In the engagement of the stop member 4 with the concave groove 23, as the cut is largely open by the formation of the inclined portion 231, the stop member 4 tends to be guided into the concave groove 23, enabling the assembly operation of the skin 1 and the insert 2 smoothly. Furthermore, when the assembly product of the skin 1 and the insert 2 is set in the foaming mold 5 by the engagement of the stop member 4 with the concave groove 23, the man-hour for positioning with lifting of the skin 1 by hand may be reduced.

Moreover, as the stay 22 is in the protruded condition by a fixed length to the outside of the skin from the predetermined position of the concave groove 23, creases produced on the skin 1 or the foaming defects and the like are eliminated and a stability of the product quality of the headrest A is secured.

In addition, even if the inside diameter $d_1$ of the stop member 4 is slightly larger, the stop member 4 is in tight contact with the deep groove surface and inclined surface (inclined portion 231 and deep groove portion 232 positioned at the upper side in FIG. 5) at the side of the end portion of the stay when the force moving outward of the skin works with the foaming pressure at the time of foam molding. As a result, a leaking and overflowing of the foamed plastics material to the outside of the skin disappear which is found sometime in the vicinity of the opening edge 14 along the stay 22. The more improving effect may be obtained in case the concave groove 23 is formed ring-like as shown in FIG. 4.

In case where a small projection 24 is provided on the stay 22 in lieu of the concave groove 23, the operation and effect identical with the foregoing contents may be obtained. Furthermore, in case the small projection 24 is provided, the stop member 4 is engaged with the small projection 24 with the inside diameter of the stop member 4 being equal to or larger than the outside diameter of the stay 22 so that the inserting operation of the stay 22 into the stay hole 11 may be performed smoothly.

In this invention, a variety of modifications are possible within the scope of the invention according to objects and uses not being limited to those described in the embodiments. The shape, size, material and the like of the skin 1, insert 2, concave groove 23, small projection 24, stop member 4 and the like may be properly chosen according to the objects. The insert is not limited to an insert bent in ⊐-shape. This invention may be applied to the stationary type headrest described in the embodiments and also to tiltable headrest. Also, the foamed plastic unit 3 is not limited to the polyurethane material and any foaming synthetic resin having a cushion property may be used.

The preferred embodiments described herein are therefore illustrative and not restrictive, the scope of the invention being indicated in the appended claims and all variations which come within the meaning of the claims are intended to be embraced therein.

What is claimed is:

1. In a headrest comprising a baglike skin with stay holes as openings, an insert whose base portion is disposed in the skin and the stays extending from the base portion protrude outward passing through the stay holes, and a foamed plastic unit integrating the skin and the insert by a foam molding upon pouring of the foamed plastics material into the skin, said headrest wherein circular ring type stop members are fixed to opening edges of the stay holes of the skin and concave grooves are provided at predetermined positions of the stays of the insert, and the stop members are engaged with the concave grooves to resist slipping movement of the skin around the stay holes during foam molding.

2. The headrest according to claim 1 wherein the stop member has the inside diameter smaller than that of the diameter of the stay, and the concave groove comprises an inclined portion that enlarges a cut on the surface side of the stay and a deep groove portion engaged with the stop member in its innermost part.

3. The headrest according to claim 2 wherein the stop member is pasted to the inside of the baglike skin.

* * * * *